(12) United States Patent
Leibow et al.

(10) Patent No.: US 8,533,602 B2
(45) Date of Patent: Sep. 10, 2013

(54) ACTIONABLE REPORTS

(75) Inventors: Corey Leibow, Pleasanton, CA (US); Shai Geva, Tel Aviv (IL)

(73) Assignee: Adobe Systems Israel Ltd. (IL)

( * ) Notice: Subject to any disclaimer, the term of this patent is extended or adjusted under 35 U.S.C. 154(b) by 1472 days.

(21) Appl. No.: 11/906,492

(22) Filed: Oct. 1, 2007

(65) Prior Publication Data
US 2008/0134048 A1     Jun. 5, 2008

Related U.S. Application Data

(60) Provisional application No. 60/850,191, filed on Oct. 5, 2006.

(51) Int. Cl.
*G06F 3/00*     (2006.01)

(52) U.S. Cl.
USPC .......................................... 715/738; 715/745

(58) Field of Classification Search
USPC ................................................ 715/745, 738
See application file for complete search history.

(56) References Cited

U.S. PATENT DOCUMENTS

| | | |
|---|---|---|
| 5,544,360 A | 8/1996 | Lewak et al. |
| 6,041,326 A | 3/2000 | Amro et al. |
| 6,347,312 B1 | 2/2002 | Byrne et al. |
| 6,553,367 B2 | 4/2003 | Horovitz |
| 6,763,349 B1 | 7/2004 | Sacco |
| 6,772,150 B1 * | 8/2004 | Whitman et al. ............. 707/721 |
| 7,035,864 B1 | 4/2006 | Ferrari et al. |
| 7,062,483 B2 | 6/2006 | Ferrari et al. |
| 7,254,581 B2 * | 8/2007 | Johnson et al. ............... 707/627 |
| 7,325,201 B2 | 1/2008 | Ferrari et al. |
| 7,505,964 B2 * | 3/2009 | Tong et al. ............................ 1/1 |
| 2002/0051020 A1 | 5/2002 | Ferrari et al. |
| 2002/0128904 A1 | 9/2002 | Carruthers et al. |
| 2002/0156770 A1 * | 10/2002 | Krichilsky et al. ............... 707/3 |
| 2003/0097357 A1 | 5/2003 | Ferrari et al. |
| 2003/0120630 A1 | 6/2003 | Tunkelang |
| 2004/0117366 A1 | 6/2004 | Ferrari et al. |
| 2005/0038781 A1 | 2/2005 | Ferrari et al. |
| 2005/0149340 A1 | 7/2005 | Murakami et al. |
| 2007/0043627 A1 | 2/2007 | Cooperman |

(Continued)

FOREIGN PATENT DOCUMENTS

WO     WO 2007/046080     4/2007

OTHER PUBLICATIONS

U.S. Appl. No. 60/729,111, filed Oct. 2005.
U.S. Appl. No. 60/850,191, filed Oct. 2006.

(Continued)

*Primary Examiner* — Omar Abdul-Ali
(74) *Attorney, Agent, or Firm* — Kilpatrick Townsend & Stockton LLP

(57) ABSTRACT

A method for managing an on-line catalog, including operating an on-line catalog system via an on-line catalog management interface, and displaying the on-line catalog on user interfaces by transmitting catalog information from the on-line catalog system to the user interfaces over a network in response to requests of end-users. The method further includes collecting data of usage by the end-users interacting via the user interfaces with the on-line catalog. A list of available actions for controlling operation of the on-line catalog is incorporated in the on-line catalog system, and in response to the data, one of the available actions is selected as an applicable action. The method also includes providing the applicable action to a catalog administrator operating the on-line system.

19 Claims, 14 Drawing Sheets

(56) References Cited

U.S. PATENT DOCUMENTS

| | | | |
|---|---|---|---|
| 2007/0112740 A1 | 5/2007 | Geva | |
| 2007/0150470 A1* | 6/2007 | Brave et al. | 707/6 |
| 2008/0134048 A1 | 6/2008 | Leibow et al. | |

OTHER PUBLICATIONS

U.S. Appl. No. 60/168,659, Dec. 1999.

Faceted Metadata for Information Architecture and Search, CHI Course for CHI 2006, by Marti Hearst, et al. http://flamenco.berkeley.edu/talks/chi_course06.pdf.

Newest Mercado Release Provides E-Commerce Merchandisers with More Control, Better Insight, and Greater Impact on Business, http://www.findarticles.com/p/articles/mi_m0EIN/is_2005_August10/ai_n14889203, Aug. 10, 2005.

Internal e-mail correspondence of Mercado Software entitled, "CSN 3.5.0 version is ready (Aug. 1, 2005)".

R.B. Allen, "Retrieval from facet spaces", Electronic publishing, vol. 8(3), 247-257, Sep. 1996.

G.P. Ellis, et al. "Hibrowse for Hotels: Bridging the Gap Between User and System Views of a Database", 1990.

A. Steven, Pollitt, et al., "Hibrowse for bibiliographic databases", Journal of Information Science, 20(6) 1994.

Peleg M., 1999 "GEOBASE—Israel in time and space", Paper presented in the SCORUS 1998 Conf. Belfast, 1999.

R.B. Allen, "Navigation and searching in hierarchical digital library catalogs", Proceedings of the 1st Annual Conf. on the Theory and Practice of Digital Libraries, Jun. 19-21, 1994, Texas, USA.

G.M. Sacco, "Dynamic taxonomies: A model for large information bases", IEEE Trans. on Knowledge and Data Engineering, vol. 12, No. 3, May/Jun. 2000.

A. Steven Pollitt, et al., "View-based searching systems—progress towards effective disintermediation", Online Information 96 Proceedings, pp. 445, Dec. 3-5, 1996.

C. Carpineto, et al., "ULYSSES: A Lattice-based multiple interaction strategy retrieval interface", In /blumenthal. Gornostaev & Unger (Es.), Human-Computer Interaction, 5th Int, Conf. EWHCI'95, Moscow, Russia, Jul. 1995.

Amin Vandat, et al., WebOS: Operating system services for wide area applications (1997), Proceedings of the 7th Symp. on High Performance Distributed Computing, 1997.

K. Takeda, et al. "Information Outlining and Site Outlining", 1997.

R.J. Miller, et al., "Integrating hierarchical navigation and querying" A user customizable solution, ACM multimedia workshop on effective abstractions in multimedia layout, presentation, and interaction, San Francisco, CA, Nov. 1995.

H.P. Kumar, et al., "Browsing hierarchical data with multi-level dynamic queries and pruning", Int. J. Human-Computer Studies (1997) 46, 103-124.

R. Godin, et al., "Design of a browsing interface for information retrieval", 1989.

R.J. Miller, et al., "DataWeb: customizable database publishing for the web", Published in IEEE Multimedia, 4(4):14-21, Oct. 1997.

R.A. Baeza-Yates, et al., "New approach to information management: Attribute-centric data systems", 2000.

Marti A. Hearst, "Interfaces for searching the web", Scientific American, Mar. 1997.

R.A. Baeza-Yates, et al., "Modern Information Retrieval", Jan. 1999.

Susan E. Aldrich, Mercado CSN V.3.0 Product Search, Patricia Seybold Group, Feb. 24, 2005.

R.B. Allen, et al., "Two digital library interfaces that exploit hierarchical structure", 1994.

G. Berry and Pierre-Louis Curien, "Sequential algorithms on concrete data structures," Theoretical Computer Science 20:265-321 (1982).

G. Khan, et al., "Concrete domains", Theoretical Computer Science 121: 187-277 (1993).

Glynn Winskel, "Event Structures", Advances in Petri nets 1986, Springer Lecture Notes in Computer Science 255 (1987).

M. Morohashi, et al., "Information Outlining—Filing the Gap between Visualization and Navigation in Digital Libraries", 1995.

U.S. Appl. No. 60/860,633, filed Nov. 2006.

U.S. Appl. No. 11/986,426, Geva, filed Aug. 15, 2008.

* cited by examiner

FIG. 9

ANALYTICS FACILITY SCREEN

SUGGESTION: APPLY SYNONYMS TO FOLLOWING TERMS IN SEARCH/NAVIGATION FACILITY

TERMS:

"SUMMER FLORAL DRESS"

SUGGESTED SYNONYMS TO APPLY:
1. FLORAL PATTERN DRESS
2. FLORAL SKIRT
3. SUMMER DRESS

ADD SYNONYMS

APPLY SYNONYMS    IGNORE SYNONYMS

XXXXXX 1. xxxxxx

ADD SYNONYMS

APPLY SYNONYMS    IGNORE SYNONYMS

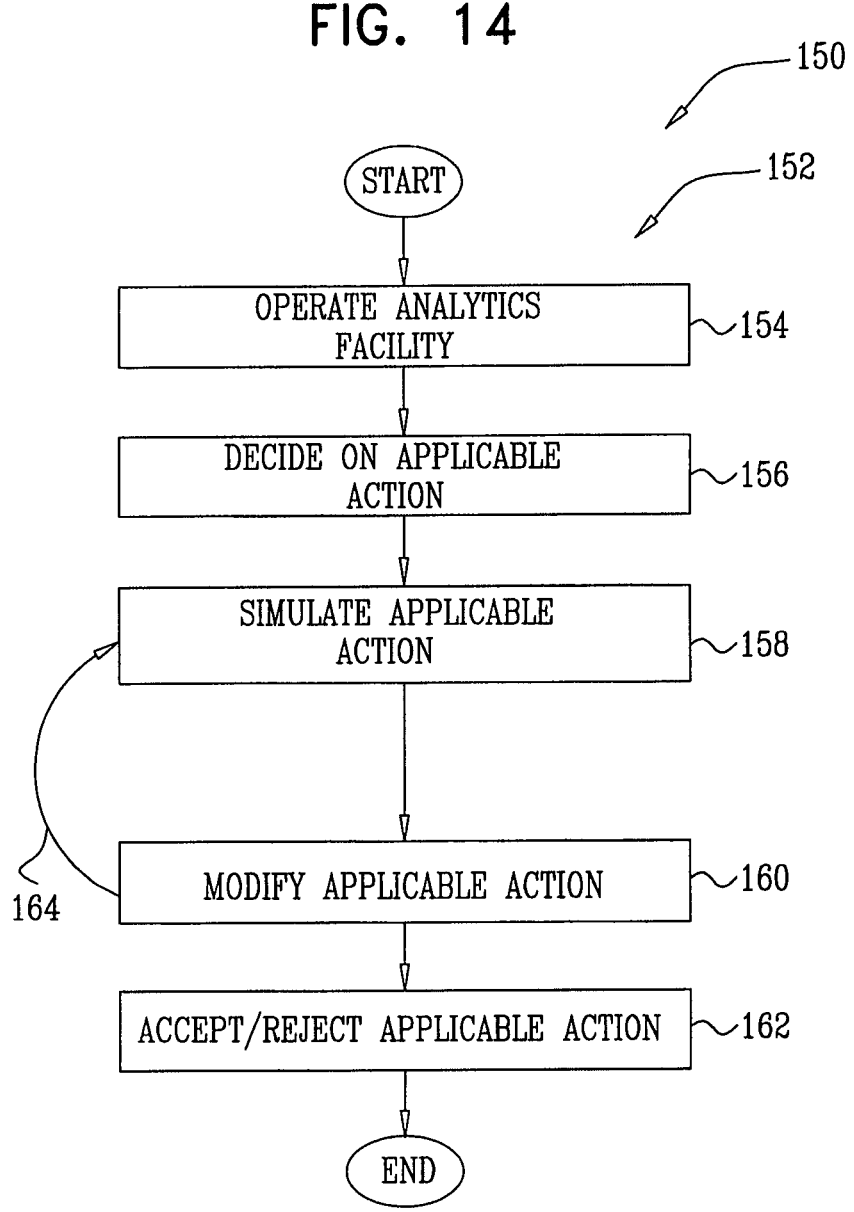

ACTIONABLE REPORTS

CROSS-REFERENCE TO RELATED APPLICATION

This application claims the benefit of U.S. Provisional Patent Application No. 60/850,191 filed 5 Oct. 2006, which is assigned to the assignee of the present invention, and which is incorporated herein by reference.

FIELD OF THE INVENTION

The present invention relates generally to on-line electronic catalog systems, and specifically to automating and optimizing search and site presentation of an on-line catalog based on collected statistics.

BACKGROUND OF THE INVENTION

On-line catalog systems typically allow an end-user to search for a particular item or class of items, and receive results based on the item or class of item searched for. Typically, the results are displayed according to their relevance to the end-user's query. The display may be changed by the end-user according to user-defined criteria. In addition, some on-line catalog systems allow an administrator of the system to modify the display of results and behavior of the system based on additional considerations, such as business considerations. For example, the administrator may choose to promote a particular brand within a class of items searched, by displaying the brand among the top ten results.

SUMMARY OF THE INVENTION

In embodiments of the present invention, an on-line catalog system displays an on-line catalog to end-users of the catalog by transmitting catalog information to the end-users over a network. Typically, the system is installed on a catalog management server, and an administrator of the on-line system controls the system over the network via an on-line catalog management interface with the server. A list of available actions that may be used for controlling operation of the on-line catalog is incorporated into the system. A data analytics facility in the system receives and formulates data of usage by the end-users of the catalog via the network. Examples of usage data include words entered into the on-line catalog as an end-user searches for an item, and conversion rates (proportions of items placed in a shopping basket that are actually purchased) for catalog items. In response to the usage data, the system automatically selects one or more of the available actions, and provides the selected actions as applicable actions for operating the catalog to the administrator, typically by presenting the applicable actions on the management interface. The automatic provision of applicable actions for operating the catalog helps the administrator manage the catalog, and enhances the efficiency of overall operation of the on-line catalog.

The applicable actions act as suggestions for operation of the on-line catalog that the system presents to the administrator. Hereinbelow applicable actions are also termed suggested actions or suggestions.

Typically, the administrator may accept or ignore the presented applicable actions. Alternatively, the administrator may modify an applicable action before implementing it. In some embodiments, the presented applicable action may be automatically implemented without intervention of, but typically with notification to, the administrator.

In an embodiment the list of available actions is generated by analysis of previous data of on-line catalog operations, or by analysis of data related to such operations. The analysis may be of previous data from the on-line catalog being managed by the administrator, and/or of other on-line catalogs for which previous operational data is available. Generation of the list includes associating a context with each available action. If, as the administrator operates the catalog system, the end-user usage data corresponds with the context, then the available action associated with the context is presented as an applicable action to the administrator.

In some embodiments, prior to implementing an applicable action, the administrator may simulate the effects of the suggestion on catalog operation, by applying the end-user usage data received over the network.

There is therefore provided, according to an embodiment of the present invention, a method for managing an on-line catalog, including:

operating an on-line catalog system via an on-line catalog management interface;

displaying the on-line catalog on user interfaces by transmitting catalog information from the on-line catalog system to the user interfaces over a network in response to requests of end-users;

collecting data of usage by the end-users interacting via the user interfaces with the on-line catalog;

incorporating in the on-line catalog system a list of available actions for controlling operation of the on-line catalog;

in response to the data, selecting as an applicable action one of the available actions; and providing the applicable action to a catalog administrator operating the on-line system.

Typically, incorporating the list of available actions includes analyzing previous data of usage of the end-users interacting with the on-line catalog, and generating the list in response to the previous data.

In an embodiment incorporating the list includes formulating respective contexts for each of the available actions in the list, and providing the applicable action including determining that one of the respective contexts corresponds with a portion of the data of usage.

In an alternative embodiment incorporating the list of available actions includes analyzing other data of usage of other end-users interacting with one or more other on-line catalogs, and generating the list in response to the other data.

In a disclosed embodiment providing the applicable action to the catalog administrator includes displaying the applicable action on a graphic user interface in the on-line catalog management interface, and prompting the catalog administrator to perform one of accepting the applicable action and ignoring the applicable action.

In another embodiment providing the applicable action to the catalog administrator includes displaying the applicable action on a graphic user interface in the on-line catalog management station, and prompting the catalog administrator to modify the applicable action and accept the modified applicable action.

In one embodiment incorporating the list in the on-line catalog system includes providing a given context for a given suggestion of the list, and providing the applicable action to the catalog administrator includes performing an automatic incorporation of the given suggestion into the on-line catalog system in response to a portion of the data of usage corresponding to the given context.

In some embodiments the data of usage includes data generated in response to a search for text, and the list of available actions includes a given available action to expand the search by using a synonym of the text in response to a future search for the text, wherein the synonym corresponds to a product of the on-line catalog.

In a further disclosed embodiment incorporating the list of available actions includes analyzing data other than data of usage of the end-users interacting with the on-line catalog, and generating the list in response to the other data.

In a further alternative embodiment providing the applicable action to the catalog administrator includes automatically incorporating the applicable action into the on-line catalog system without intervention of the catalog administrator.

There is further provided, according to an embodiment of the present invention, apparatus for operating an on-line catalog system providing an on-line catalog, including:

an on-line catalog management interface which is configured to operate the on-line catalog system; and a processor, coupled to the on-line catalog management interface, which is configured to:

transmit catalog information from the on-line catalog system to user interfaces over a network, so as to cause the user interfaces to display the on-line catalog thereon in response to requests of end-users;

collect data of usage by the end-users interacting via the user interfaces with the on-line catalog;

incorporate in the on-line catalog system a list of available actions for controlling operation of the on-line catalog;

in response to the data, select as an applicable action one of the available actions; and provide the applicable action to a catalog administrator operating the on-line system.

There is further provided, according to an embodiment of the present invention, a computer software product for managing an on-line catalog, the product comprising a computer-readable medium having computer program instructions recorded therein, which instructions, when read by a computer, cause the computer to:

operate an on-line catalog system via an on-line catalog management interface;

display the on-line catalog on user interfaces by transmitting catalog information from the on-line catalog system to the user interfaces over a network in response to requests of end-users;

collect data of usage by the end-users interacting via the user interfaces with the on-line catalog;

incorporate in the on-line catalog system a list of available actions for controlling operation of the on-line catalog;

in response to the data, select as an applicable action one of the available actions; and provide the applicable action to a catalog administrator operating the on-line system.

The present invention will be more fully understood from the following detailed description of the embodiments thereof, taken together with the drawings, a brief description of which follows.

BRIEF DESCRIPTION OF THE DRAWINGS

FIGS. 5-13 are exemplary diagrams of screens generated during the process of FIG. 4, according to embodiments of the present invention; and FIG. 14 is a flowchart of a process performed by the administrator to simulate an applicable action, according to an embodiment of the present invention.

DETAILED DESCRIPTION OF EMBODIMENTS

Overview

Figure 1:
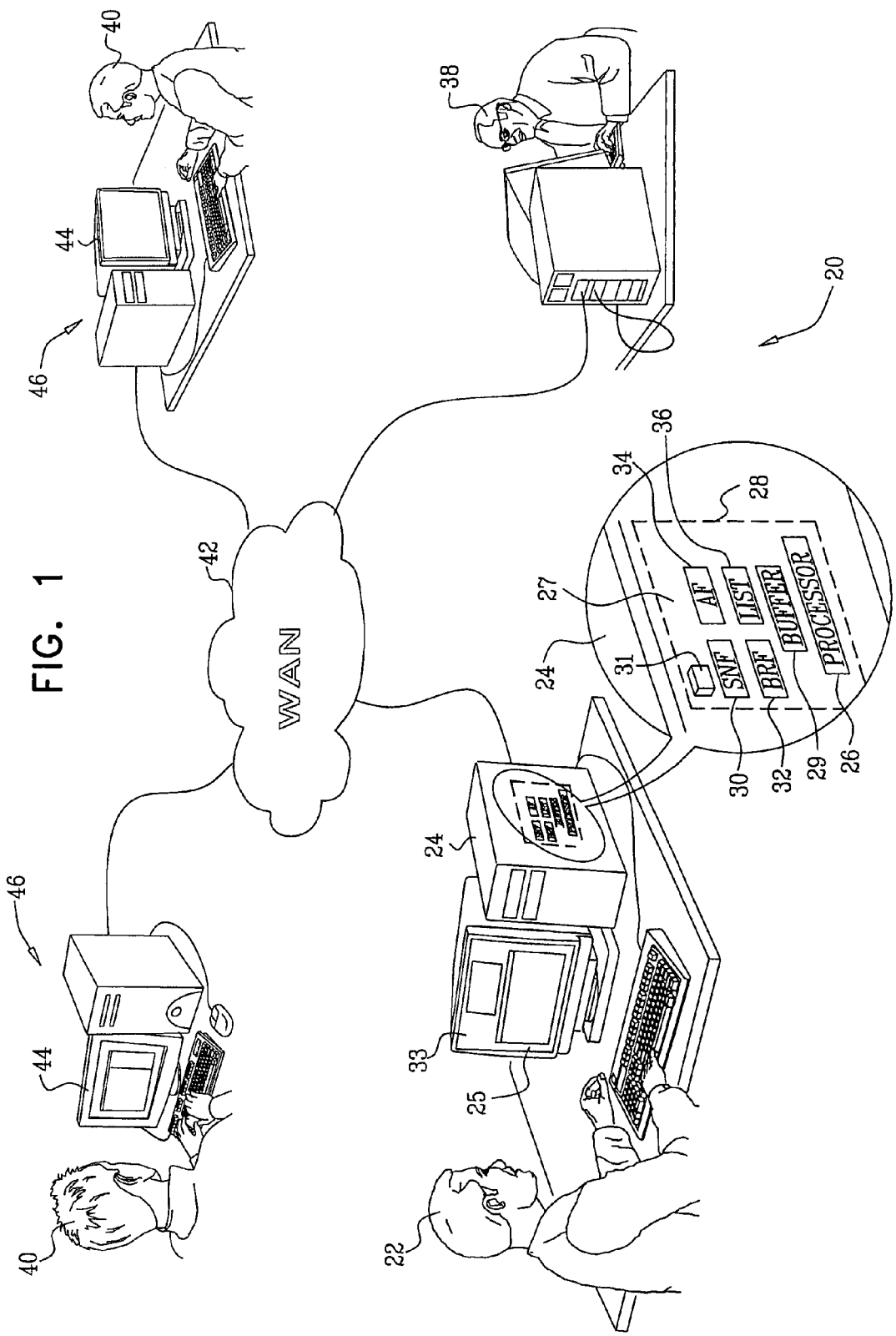
FIG. 1 is a schematic diagram of an on-line catalog merchandising catalog software system, according to an embodiment of the present invention.

In embodiments of the present invention, an on-line merchandising catalog software system comprises three components: a search/navigation facility, a business rules facility, and an analytics facility, all of which are under control of one or more human catalog administrators, herein by way of example assumed to be one person. The system is operated by a processing unit which is typically in a server or personal computer run by the administrator. Alternatively, the system may be operated by multiple computers, typically distributed over a network. Herein, by way of example the system is assumed to be operated by an on-line catalog management server, and the administrator is assumed to control the system via an on-line catalog management interface. The software system is fabricated, installed, and maintained, by a software developer, typically comprising one or more programmers.

The system displays an on-line catalog on user interfaces of end-users, who interact with and operate the on-line catalog via the user interfaces. The user interfaces typically comprise browsers operated by personal computers, and the browsers typically communicate with the on-line catalog management server via a network such as the Internet, or alternatively via other means of communication. The user interfaces may comprise an Application Program Interface (API).

The search/navigation facility of the on-line catalog presents the end-users with one or more methods that enable the end-users to focus on desired merchandise, chosen from a range of merchandise covered by the catalog. Typically the search/navigation facility comprises a free text search engine, as well as navigation components that enable a given end-user to navigate to a desired product or group of products. For example, in a department store catalog, to locate a food processor an end-user may start by typing "processor" into the text search engine, or selecting "small kitchen appliances" from a drop-down menu of classes of items included in the catalog.

The business rules facility comprises conditional actions, termed rules, that are incorporated into the on-line catalog system by the catalog administrator. The rules affect search results and additional auxiliary results presented to the end-user by the search/navigation facility, as well as aspects of system behavior, such as a number of answers presented. A business rule has one or more triggers, a trigger being a specification of circumstances causing the rule to activate. Typically a trigger is matched with a search/navigation request submitted by an end-user, or is matched with a result of such a request. Examples of result-based triggers are provided in U.S. Patent Application 2007/0112740, which is assigned to the assignee of the instant application and which is incorporated herein by reference.

For example, a business rule may generate a banner on the screen saying "Kenwood® mixers are on special this week." A trigger for this business rule could be an end-user typing "processor" into the text search engine of the on-line catalog, or electing "small kitchen appliances" from a drop-down menu. As a second example, in response to an end-user searching for "laptop computers" using a free text search, a business rule having "laptop" as a trigger may provide a list of computers with Macintosh® laptop computers first on the list to the end-user.

The analytics facility collects statistics of end-user operations of the on-line catalog. The facility may use the statistics for generating alerts to the administrator, for data mining, and/or for generating reports that allow the catalog administrator to analyze actions performed by end-users as they use elements of the catalog provided by the search/navigation facility, such as the text search engine or drop down menus. The actions may include other elements of the catalog, such as characteristics of the end-user's shopping basket and/or purchasing behavior. For example, for an on-line book catalog the administrator may generate a report listing all sailing books in the catalog, the number of users that have inquired for each sailing book in the last week, and the number of orders that have been placed for each sailing book. Other reports may focus on end-user overall queries, text searches, searches producing no results, and/or actions by the end-user producing low conversions, i.e., wherein an item has been placed in a shopping basket but has not actually been purchased.

Embodiments of the present invention automatically provide, as part of a report presented to the administrator, suggestions, also termed applicable actions, on how to improve the catalog presentation to the end-user. The applicable actions typically incorporate best practices, i.e., recommended ways for implementing actions that have been developed in the on-line catalog art. Such best practices will be available to the software developer and/or administrator, typically as a result of previous analysis of, and experience with, on-line catalogs controlled by the developer and/or administrator, and possibly analysis of and experience with other on-line catalogs. The applicable actions may apply to the search/navigation facility, for example by suggesting a synonym for a search item, and/or to the business rules facility, for example by suggesting a rule via a rule template.

Rule templates, examples of which are provided below, simplify and automate the process of rule generation by the administrator. A rule template comprises a rule, incorporated into the on-line catalog software, which may be incomplete. When used to produce an applicable action, the rule template is instantiated by the context of the corresponding available action, to produce a rule. The rule may be either fully specified or incomplete. Such an incomplete rule typically requires explicit action from the administrator, to complete the rule's specification, so that it may be implemented. Alternatively, the rule template once instantiated may be complete, requiring no action from the administrator except for its implementation.

Typical applicable actions include:
Promote, or demote, a specific product.
Promote or demote the answers to a particular query.
Set a particular query to function as a trigger.
Add a synonym to a given text, so that a future search for the text is expanded to include the synonym.

The software developer incorporates a list of available actions, and a context for each available action, into the system. The context acts as a "suggestion-trigger," so that an available action becomes an applicable action if the context corresponds with the usage data. The catalog administrator is made aware of the presence of applicable actions as she/he inspects reports.

System Description

Reference is now made to FIG. 1, which is a schematic diagram of an on-line catalog merchandising catalog software system 20, according to an embodiment of the present invention. System 20 is operated by a catalog administrator 22, using an administration server 24, also herein termed an on-line catalog management server. Server 24 comprises an on-line catalog management interface 25 which typically includes a graphic user interface 33, and a processor 26 coupled to a memory 28, which typically includes volatile memory 27 and non-volatile memory 31. System 20 comprises a search/navigation facility (SNF) 30, a business rules facility (BRF) 32, and an analytics facility (AF) 34, which function as described above and which typically comprise components stored in memory 28. In addition, system 20 also comprises a list 36 of available actions, and an applicable action buffer 29, the properties and functioning of which are described below. System 20 may be downloaded as a computer software product to server 24 in electronic form over a network, or alternatively or additionally the system may be supplied on a tangible computer-readable medium, such as one or more CD-ROMs, that is readable by a computer.

The software facilities of system 20 listed above comprise separate components which may be developed by separate software developers or development teams. Hereinbelow, by way of example, all system 20 is assumed to be developed by one developer 38, the development including incorporation of list 36 of available actions into system 20.

Typically, the day-to-day operation of system 20 is performed by administrator 22 via server 24 and interface 25. However, as described below, the initial framework defining how the system operates, such as the conditions governing the conversion of a given available action in list 36 into an applicable action, is typically preset. In some embodiments of the present invention, the conditions may be reset by administrator 22.

Generally similar end-users 40 operate user interaction facilities 44, installed in end-user computing systems 46, to access the on-line catalog generated by system 20. Systems 46 typically comprise personal computers and/or other electronic equipment such as cellular phones, personal digital assistants, and/or in-store kiosks. The communication between end users 40 and system 20 is typically via a wide area network (WAN) 42, such as the Internet.

Figure 2:
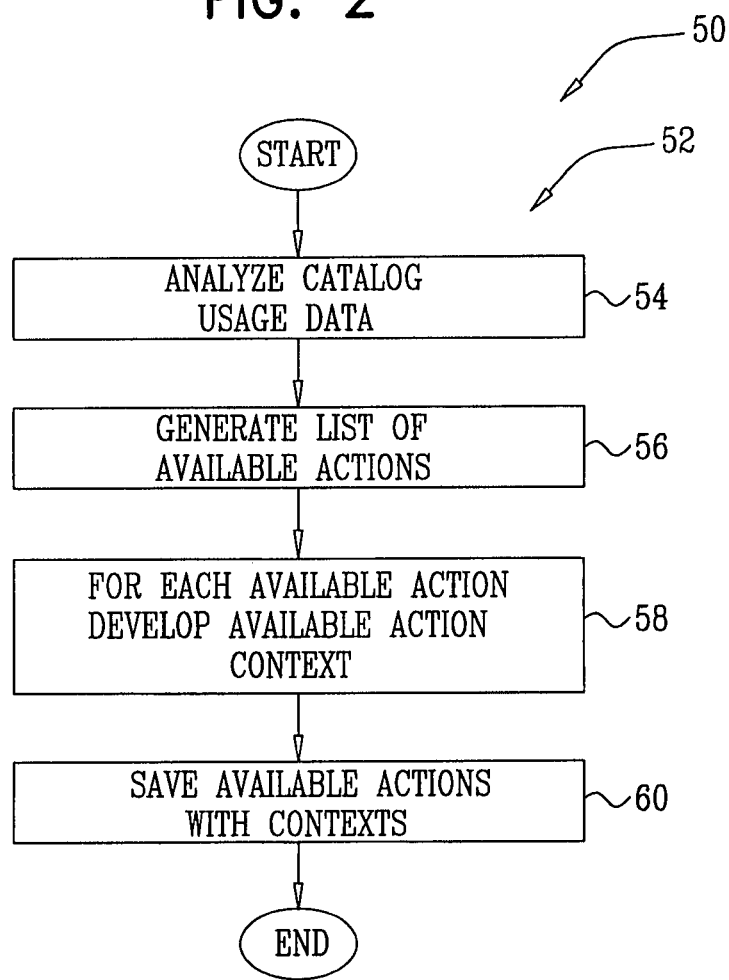
FIG. 2 is a flowchart of a process to generate a list of available actions, according to an embodiment of the present invention.

FIG. 2 is a flowchart 50 of a process 52 to generate list 36, according to an embodiment of the present invention. Typically, process 52 is implemented prior to system 20 being used by administrator 22 in consultation with other administration personnel having experience with on-line catalogs. Hereinbelow, by way of example, it is assumed that developer 38 implements process 52.

In a first step 54, developer 38 analyzes previous on-line catalog usage data. The data used typically includes historical data from a variety of different on-line catalogs that are already in operation. Additionally or alternatively, the data used may be from any convenient source to which developer 38 has access, including, for example, market data which affect demand for items included in an on-line catalog that is to be operated by system 20. The developer typically employs merchandising methodology and best practices gained from previous experience.

In a second step 56, from the analysis of the data, the developer generates a list of available actions for incorporation into system 20. The available actions typically include a "wish list" of actions that administrator 22 or other similar personnel would have implemented given the analyzed data. Some examples of data, corresponding to phenomena to be accounted for in the wish list, and available actions are given in Table I below:

TABLE I

|   | Data (Phenomena to be accounted for) | Available action |
|---|---|---|
| 1 | Text search giving "No Results" | Redirect end-user according to context of text search. |
| 2 | Text search giving "No Results" | Provide results from stocked products corresponding to synonyms of the entered text, or words related to the entered text. |
| 3 | Text search giving "No Results" | Generate response "We do not have 'text searched,' but we do have 'related items.' Would you like to see the related items?" The related items are stocked products that correspond to synonyms of the entered text, or words related to the entered text. |
| 4 | Low conversion rate for a particular product | For rates below a specific level, offer free shipping for the product. |
| 5 | Low conversion rate for a particular product | For rates below a specific level, and if there is already a preset total value of products in the shopping basket, offer a preset discount if all items are converted. |
| 6 | Product has high profit margin | Promote product by having product appear early in a list of similar products presented to the end-user. |
| 7 | Product has low profit margin | Demote product by having product appear later in a list of similar products presented to the end-user. |
| 8 | Particular Brand Name searched | Generate response "We have found that customers searching for this brand also purchased 'other brand' items. Would you like to see 'other brand' items?" |

Other data and related available actions will be apparent to those having ordinary skill in the on-line catalog art, and are included in the scope of the present invention.

Typically, the developer constructs the available actions in the form of complete or incomplete rule templates, for incorporation in BRF 32. As described below with respect to flowchart 80, in the case of a complete rule template the administrator may accept the template's suggested action so that the action may be applied as part of end-user interaction with the catalog. In the case of incomplete rule templates the administrator is prompted to complete the suggested action so that it may be applied.

Alternatively or additionally, the available actions may include incorporating a change in SNF 30, so that an action generated by the facility for the end-user is altered.

In a third step 58, the developer formulates a context for each of the available actions. The context is typically related to the contents of the first column of Table I. The context provides system 20 with one or more conditions, or "suggestion-triggers," under which, when one of the conditions is satisfied, the system provides the available action to administrator 22 as an applicable action.

For example, the context for the "redirect" available action in row 1 of Table I may be a text search query returning "No Results" and that the text search includes the word "job." The context for the available actions of row 2 and row 3 is typically that the on-line catalog has products corresponding to synonyms of the text searched. The context for the available actions of row 4 and row 5, for low conversion rate products, may be that the conversion rate is below a preset value, for example 30%. In addition, the context for row 5 may include a total value of the shopping basket items. The context for the available actions of rows 6 and 7 is typically that the profit margin for a particular product is more than (row 6), or less than (row 7) preset values. The context for the available action of row 8 may be a search for a product of the searched Brand Name, and that the conversion rate for the 'other brand' product is above a preset value.

In defining the available actions of list 36, the developer typically incorporates steps that add to the usefulness of the available actions, based on the context of the actions. For example, in the case of rows 2 and 3 of Table I, the developer may incorporate into an available action that synonyms may be determined using one or more dictionaries that may advantageously comprise dictionaries and/or taxonomies that are specific to the industry of the on-line catalog of system 20. Such dictionaries and taxonomies may comprise third party items, and are typically provided to system 20 via network 42.

To generate meaningful synonyms the developer may incorporate into an available action other search tools. For example, to find a synonym for a generic term "xxxx," the developer may incorporate that one or more documents that are available over network 42 and that have xxxx are searched. A synonym may be considered to be any word having similar co-occurrence statistics to xxxx, and that is in the on-line catalog of system 20.

In a final step 60, developer 38 stores the contexts with their associated available actions in system 20 in SNF 30 and/or BRF 32. In addition, the contexts and associated available actions are stored as list 36 (FIG. 1). List 36 thus comprises a set of ordered pairs of contexts $C_n$ and available actions $SA_n$, where n is a positive integer, as given by expression (1):

$$\{(C_1, SA_1), \ldots, (C_n, SA_n), \ldots\} \quad (1)$$

Figure 3:
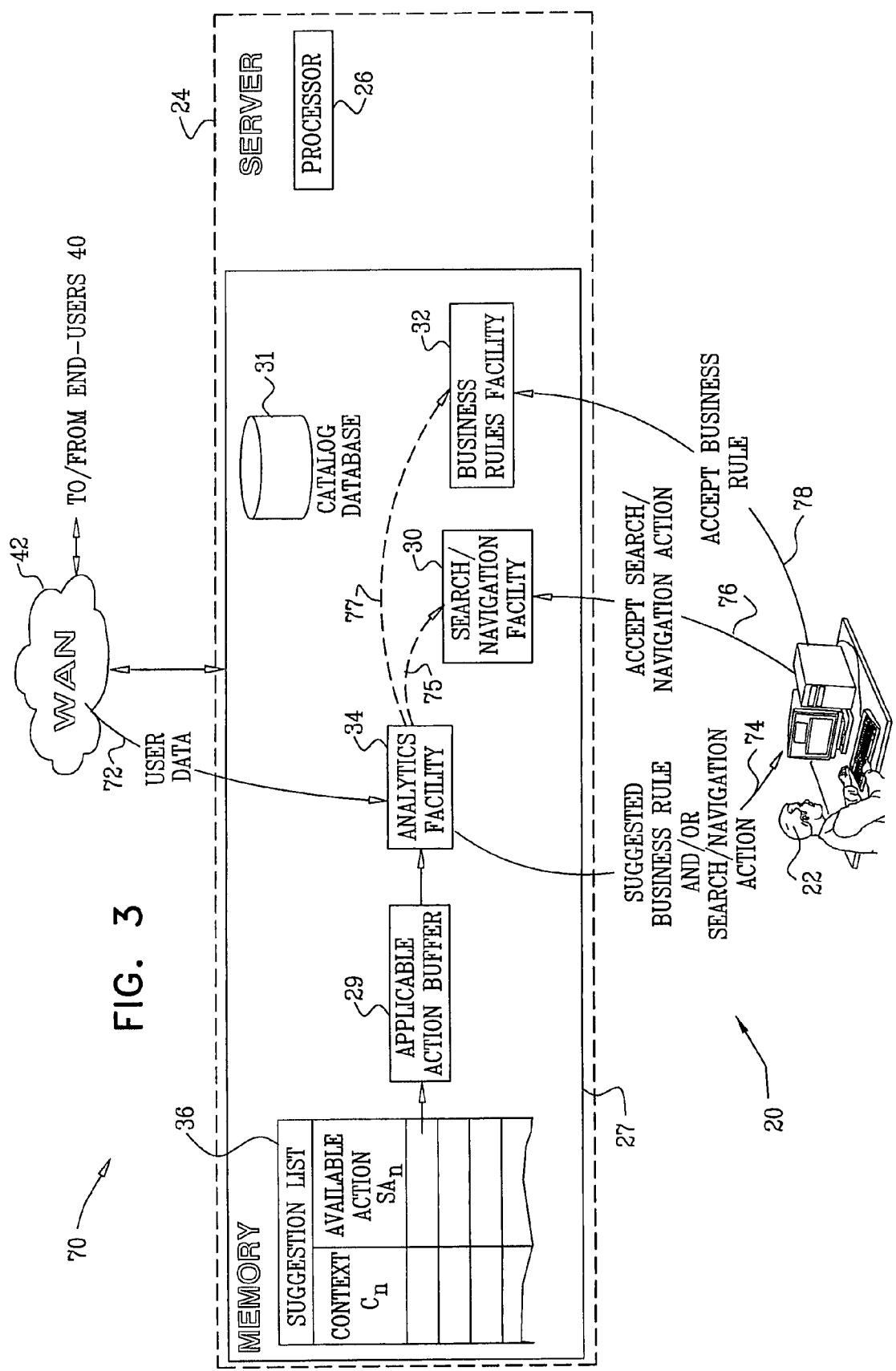
FIG. 3 is a block diagram illustrating operation by an administrator of the system of FIG. 1, according to an embodiment of the present invention.
Figure 4:
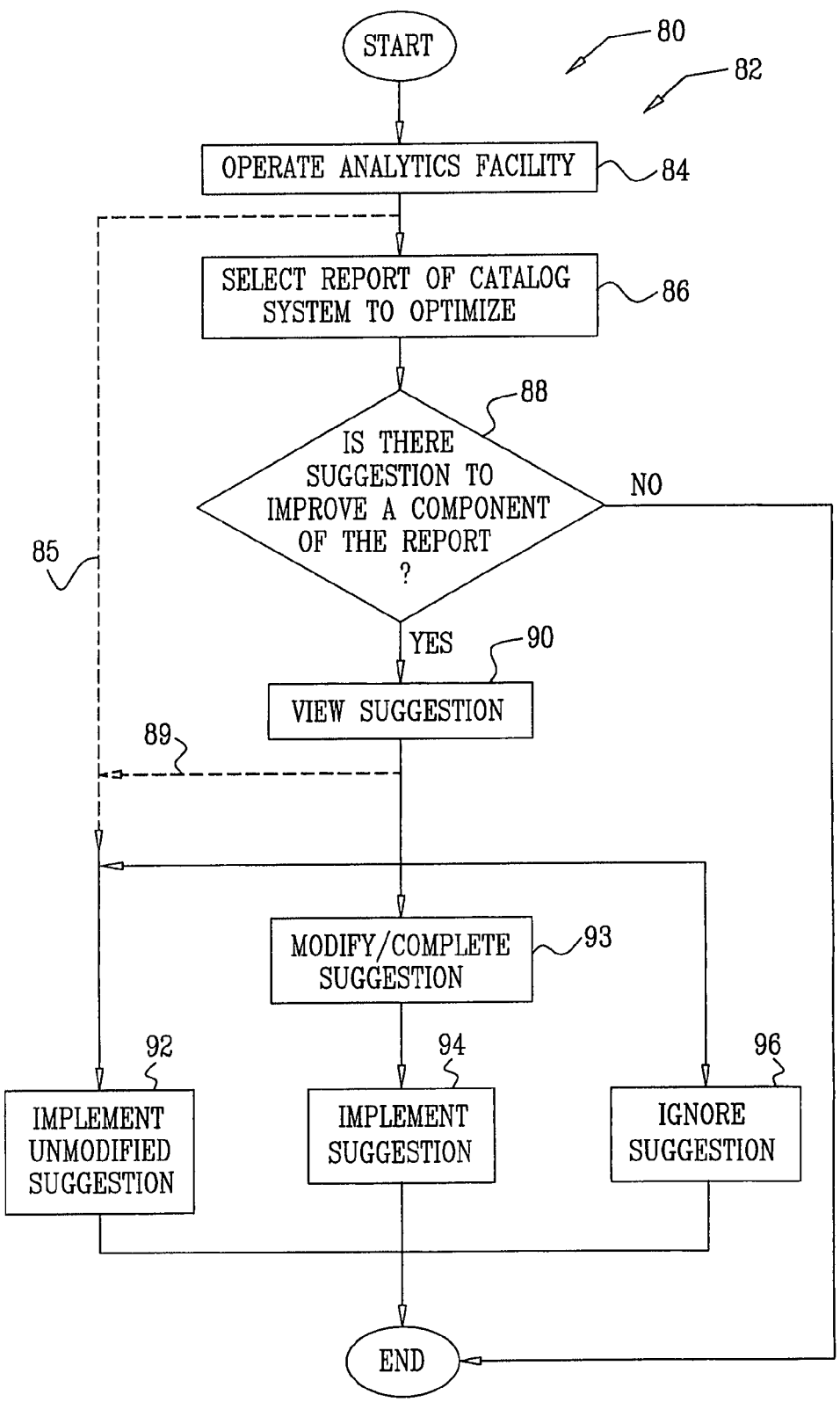
FIG. 4 is a flowchart of a process performed by the administrator, according to an embodiment of the present invention.

FIG. 3 is a block diagram 70 illustrating the operation by administrator 22 of system 20, FIG. 4 is a flowchart 80 of a process 82 performed by the administrator, and FIGS. 5-13 are exemplary diagrams of screen grabs generated during process 82, according to embodiments of the present invention. As is described below, the screen grabs of FIGS. 5-13 include screens which are derived from the list 36 of available actions generated in process 52 (FIG. 2). Block diagram 70 illustrates elements comprised in server 24 in more detail than they are shown in FIG. 1.

Administrator 22 uses AF 34 to implement process 82. In order for the administrator to implement the flowchart, processor 28 has previously recorded and stored, or otherwise obtained, such as via a web-analytics product performing data collection and summarization, usage data of the on-line catalog by end-users 40, and this data is available to the analytics facility, as indicated by line 72 of diagram 70. The usage data includes, inter alia, data on characteristics of searches performed by the end-users, typically consisting of text entered, constraints applied, numbers of repetitions of the search, i.e., typically its ranking or frequency, how many results were returned by the search, and whether or not the search produced results. Other usage data which AF 34 may record and store, such as events of placing products in basket, purchase of products, or conversion rates for searches or catalog products, will be familiar to those having ordinary skill in the on-line catalog arts.

As is illustrated in FIG. 3 by line 74, process 82 provides a suggested business rule and/or a suggested search/navigation action to administrator 22, who is able to implement the suggestion on SNF 30 or BRF 32, as illustrated by lines 76 and 78. The suggested business rule and/or suggested search/navigation action correspond to the applicable actions described above.

As is also shown in FIG. 3, server 24 comprises list 36, which is incorporated into memory 28 according to flowchart 50 (FIG. 2). List 36 comprises a table giving correspondences between contexts $C_n$ and available actions $SA_n$, analogous to expression (1).

Figure 5:
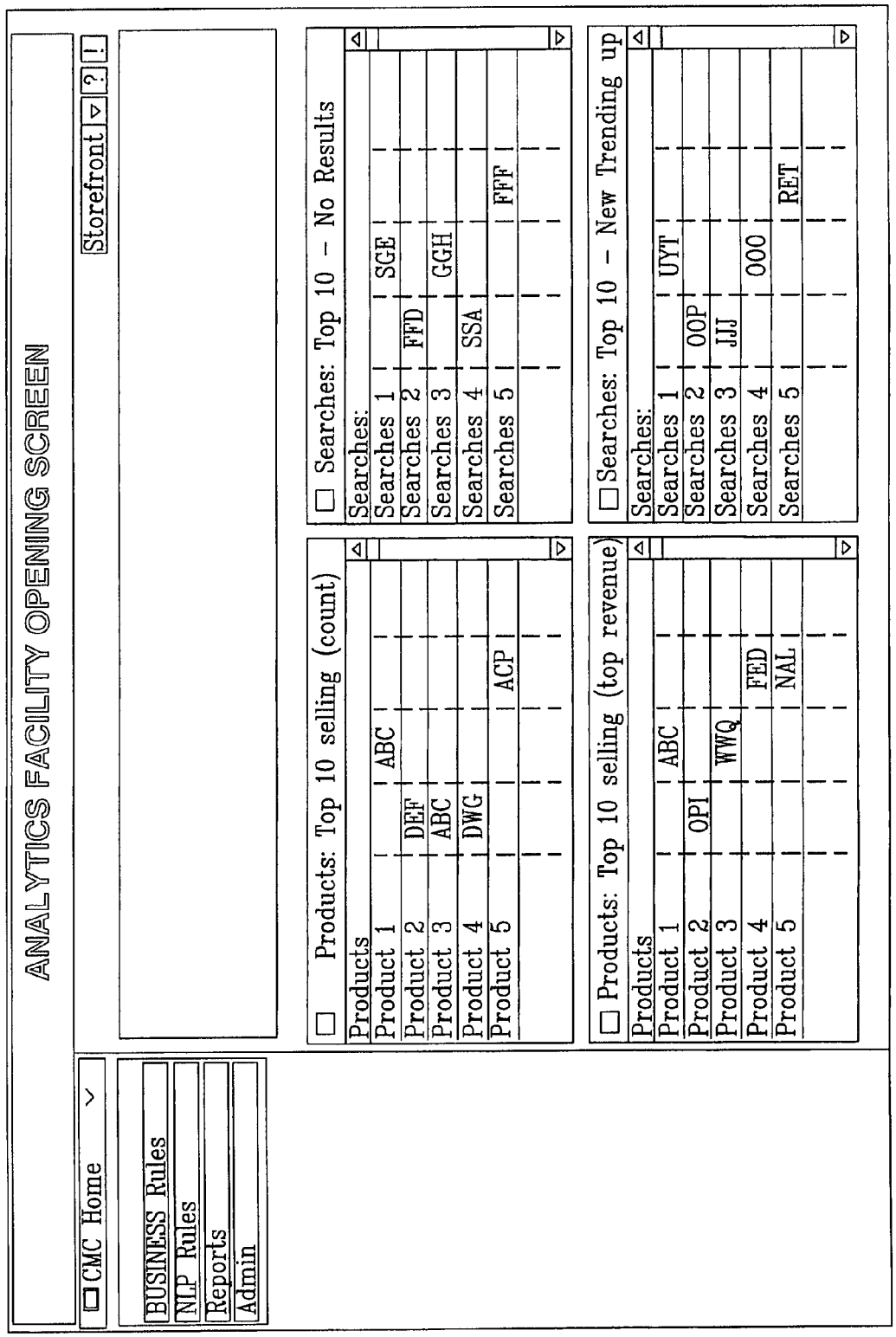

In a first step 84 of process 82, administrator 22 operates analytics facility 34. FIG. 5 shows part of an exemplary analytics facility opening screen generated by system 20 at the conclusion of step 84, summarizing classes of components of the on-line catalog system, and reports of analyses available to the administrator. In the example described herein, the components available to the administrator are grouped in reports: "Products: Top 10 Selling (count);" "Products: Top 10 Selling (revenue);" "Searches: Top 10 No Results;" and "Searches: Top 10 New/Trending Up."

In a second step 86 the administrator selects a report to optimize. On selection, processor 26 checks if one of contexts $C_n$ corresponds with components present in the report selected. If there is a correspondence, processor 26 places each available action $SA_n$ of the contexts, and relevant data from the contexts, in applicable action buffer 29. The context thus acts as a suggestion-trigger. The available actions in the buffer are applicable actions or suggestions for improving the component of the class being analyzed.

In a decision step 88 processor 28 checks if there are suggestions in buffer 29. If there are no suggestions flowchart 80 ends. If there are suggestions in the buffer, the flowchart continues.

Figure 6:
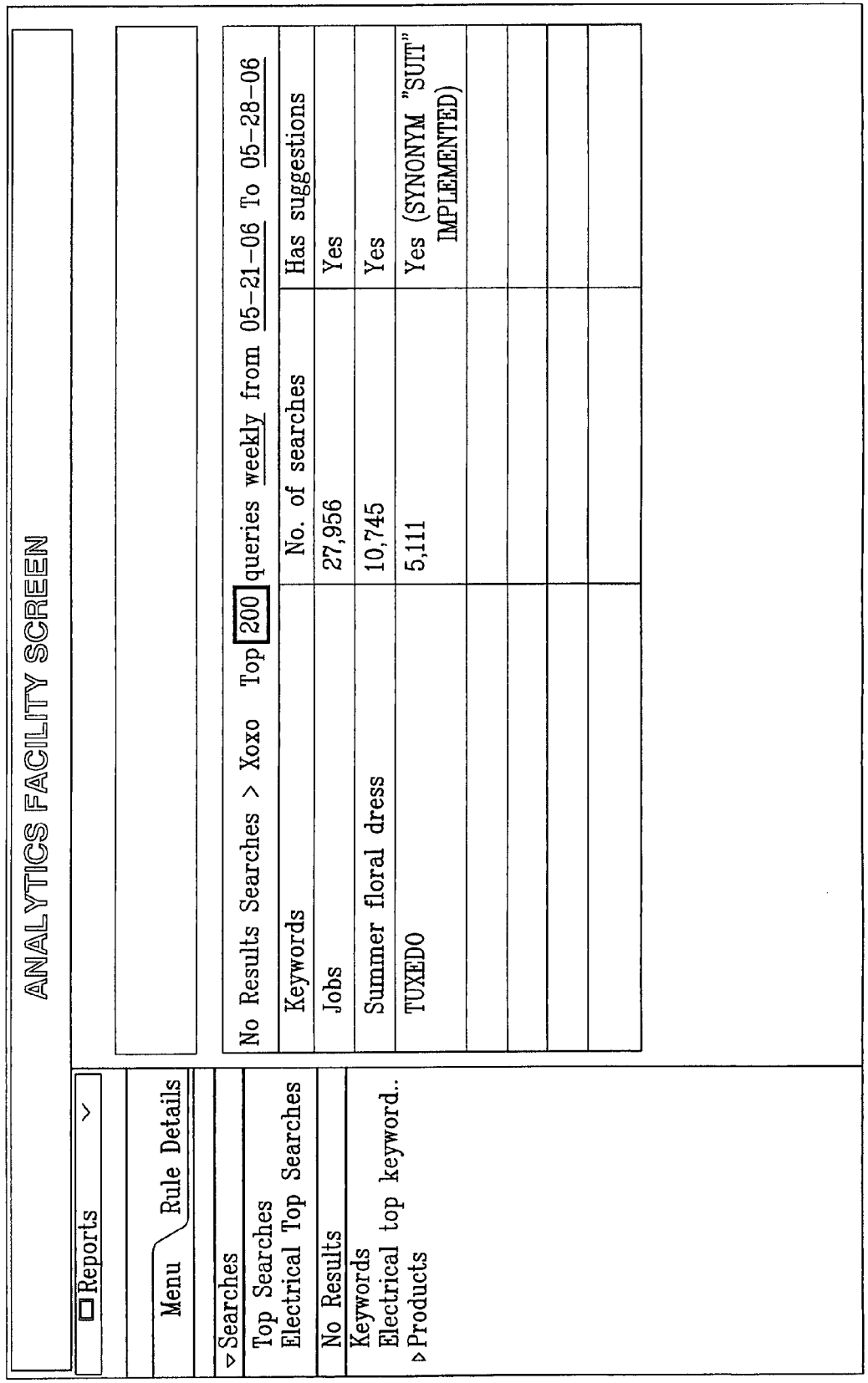

FIG. 6 shows a report detailing "No Result" searches, exemplifying the result if at second step 86 the administrator elects to analyze report "Searches—Top 10 No Results" in the opening screen (FIG. 5). In the column titled "Has suggestions," "Yes" indicates that for each of the components listed, there is an applicable action in buffer 29, so that system 20 has a suggestion for improving the present catalog.

Returning to flowchart 80, if there are suggestions in the buffer, the flowchart continues to a step 90, wherein the administrator views the applicable action as part of a report on the selected component.

From step 90 there are three possible paths that administrator 22 may follow: in a first path, corresponding to a step 92, the suggestion is implemented without change; in a second path, corresponding to a step 93 followed by a step 94, the suggestion is modified and/or completed and the modified/completed suggestion is implemented; or in a third path, corresponding to a step 96, the suggestion is ignored. After following one of these paths, flowchart 80 ends.

In some embodiments of the present invention, an applicable action may be implemented substantially automatically, without intervention of the administrator, as shown by broken lines 85 and 89 of process 82, and as is described in more detail below. The automatic implementation is also indicated by broken lines 75 and 77 in FIG. 3. For example, as exemplified by line 89, in the screen of FIG. 6 presented to the administrator, if an applicable action has been automatically implemented, rather than "Yes" appearing in the Has Suggestions column, a statement describing the suggestion, and stating that it has been automatically implemented, appears in the column. FIG. 6 illustrates that a suggestion has been automatically implemented for the text "TUXEDO."

Figure 7:
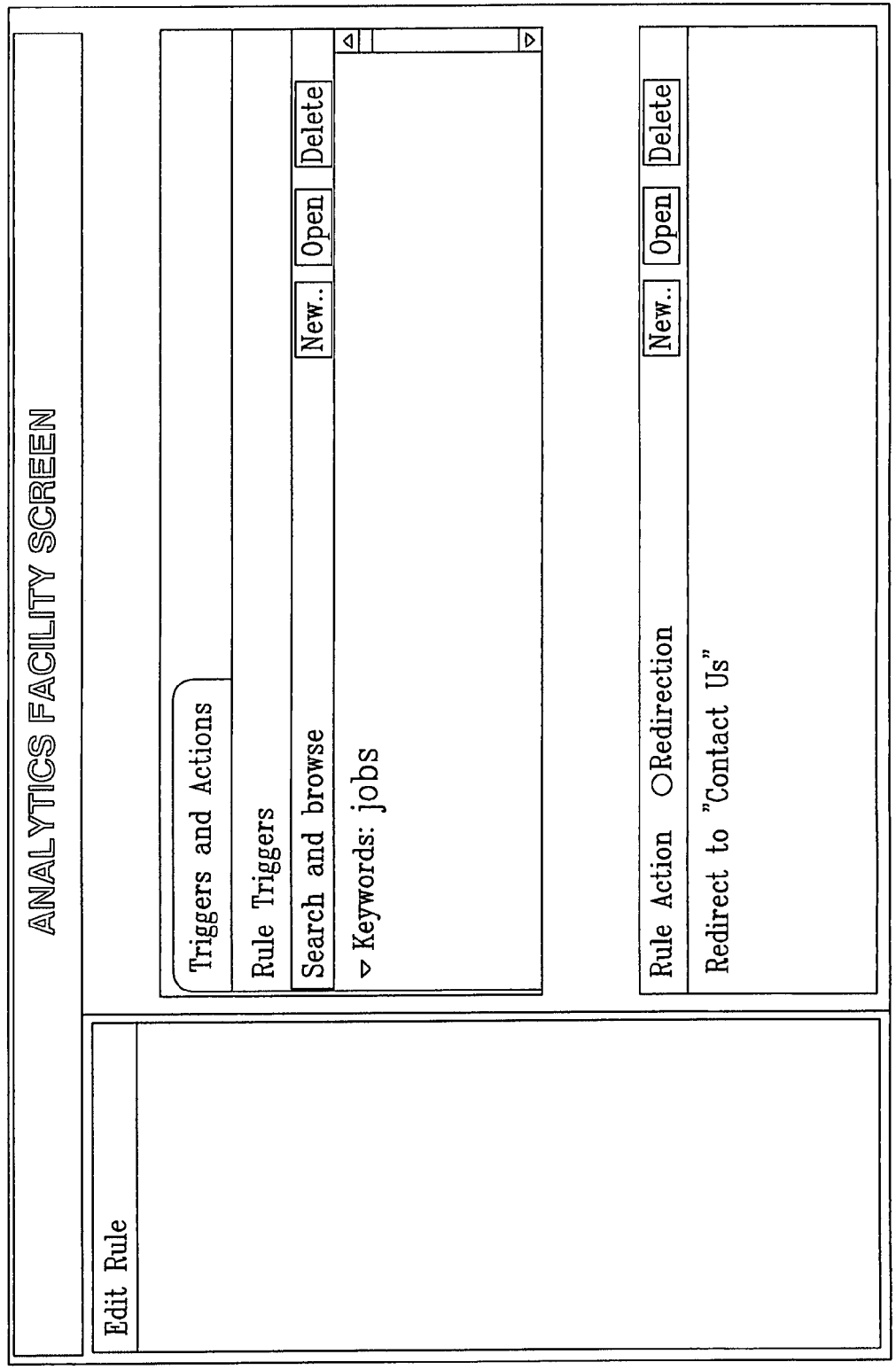

FIG. 7 shows a first example of an applicable action presented in step 90 to the administrator. The available action corresponding to the applicable action is developed in process 52 as a completed business rule template, and the context associated in process 52 with the rule template is a search result giving "No results" and a free text search for "jobs." The completed rule template has a trigger which is activated by an end-user using "jobs" as a keyword in the search engine. The rule has an action which automatically redirects the end-user to the "Contact Us" section of the on-line catalog. In step 90 the applicable action is presented to the administrator as a completed rule template.

The administrator may follow the first or the third path described above by accepting the rule as in the template presented, or by ignoring the applicable action. Alternatively, in following the second path, the administrator may modify the rule by altering the rule action or keywords. For example, the administrator may add the word "employment" into the keywords triggering the rule, and/or may add in to the rule action a banner listing job areas that have vacancies.

Figure 8:
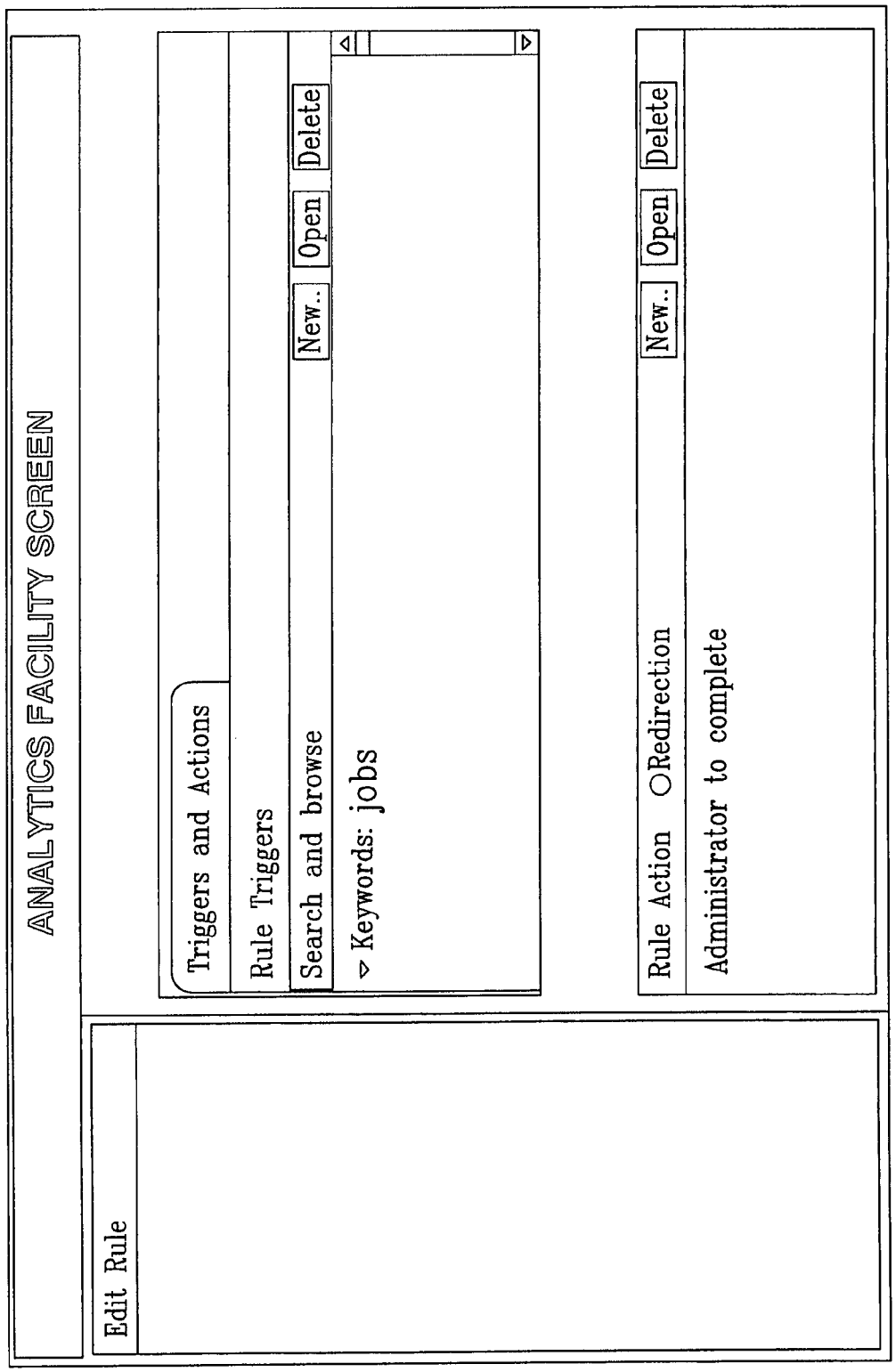

Further alternatively, as illustrated in FIG. 8, the available action developed in process 52 may be an uncompleted rule template, wherein the context associated with the rule template is as above, i.e., a search result giving "No results" and a free text search for "jobs," but wherein the administrator is required to complete the action of the rule. In this case the administrator may complete the rule, generally as described above with reference to FIG. 7. Alternatively or additionally, the administrator may complete the rule in a different manner, for example by generating a banner listing areas of job vacancies and their requirements, and requesting that qualified applicants go to the "Contact Us" section.

FIG. 9 shows a third example of an applicable action presented by the analytics facility in step 90 to the administrator. The applicable action is developed in process 52 as an available action to be applied to the search/navigation facility, and the context associated in process 52 with the action is a search result giving "No results" and a free text search that includes a word for which the on-line catalog comprises products described by a synonym of the word. The available action is to present listed synonyms of on-line catalog products to the end-user.

Returning to step 86 and FIG. 6, the screen grab also shows that the term "Summer floral dress" was searched, and produced no results. Assuming that the on-line catalog has products described by synonyms of "dress," and that the applicable action of FIG. 9 has been developed as an available action in process 52, in step 88 there is a positive answer, and FIG. 6 displays "Yes" in the Has Suggestions column for the search "Summer floral dress."

FIG. 9 shows the applicable action for a context of a free text search for "Summer floral dress" occurring with "No Results." The action displayed in step 90 suggests that the administrator allows synonyms of words in the free text to be searched for. Advantageously, the applicable action may display to the administrator synonyms of words that would have produced results, if the applicable action is implemented. For example, the catalog may include items listed as "flower pattern dress," "floral skirt," and "summer dress," and these items may be displayed to the administrator. The administrator may accept these items, and in addition, the administrator may add synonyms.

Figure 10:
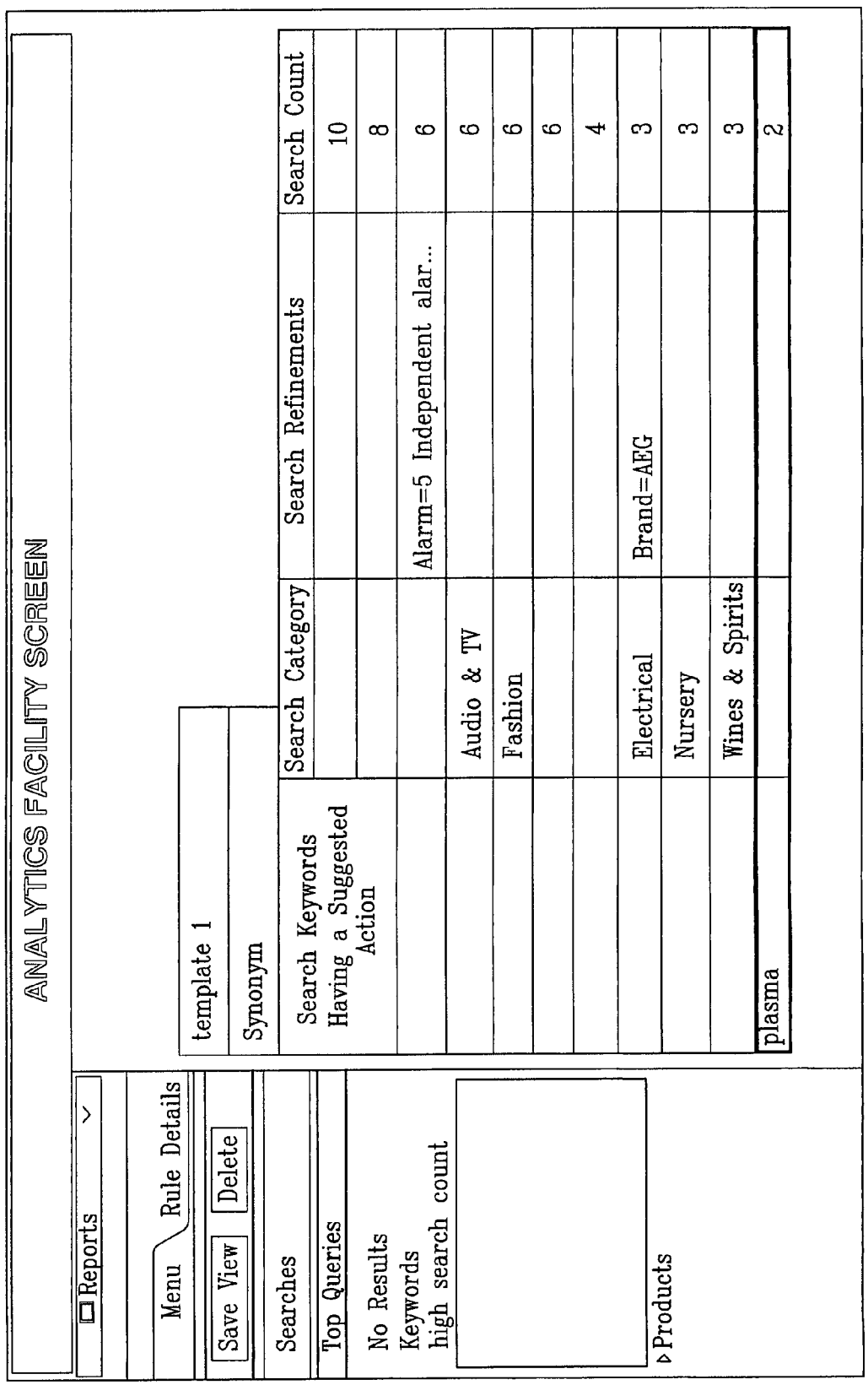
Figure 11:
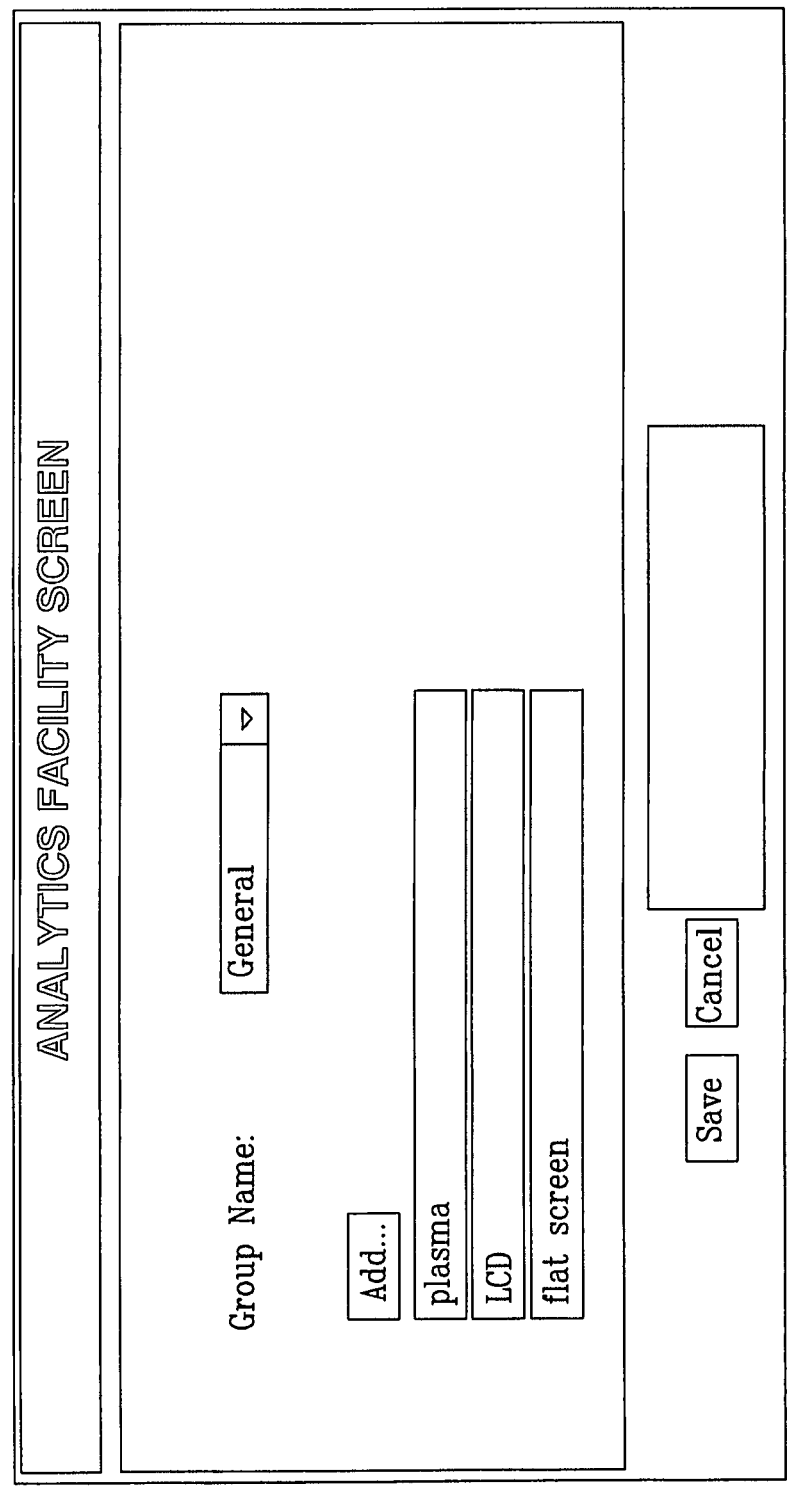

FIGS. 10 and 11 are screens which illustrate another applicable action for the search/navigation facility that is automatically provided to the administrator by the analytics facility. In process 52 the corresponding available action developed is to apply a synonym, and the context is a free text search classified as a Top Query. The synonym may be chosen from descriptions of items in the catalog, and/or from another source of synonyms such as a thesaurus.

In step 86 of process 82, the administrator has selected the "Top Queries" that have been input by the end-users. FIG. 10 is the screen presented to the administrator. In this example, the only end-user query involving a free text search that has an applicable action is an end-user search for "plasma." When the administrator selects plasma, a drop-down menu becomes available, and includes a synonym option.

FIG. 11 illustrates the result of the administrator selecting the synonym option. The result is a dialog box that suggests that "LCD" and/or "flat screen" may be applied as a synonym for plasma. If the synonyms are accepted, a future search by an end-user for "plasma" expands the search to also search for "LCD" and "flat screen." The terms LCD and flat screen are typically derived from synonym finding tools such as those described above with reference to step 58 of process 52. The determination of synonyms may occur at substantially any time up to, and including, the time at which the administrator selects the synonym option, and it will be understood that the determination of synonyms is substantially fully automatic. The administrator may accept (Save) or reject (Cancel) the suggestions, corresponding with steps 92 or 96. The administrator may also use the dialog box to add, remove, and/or change synonyms, corresponding with steps 93 and 94.

Figure 12:
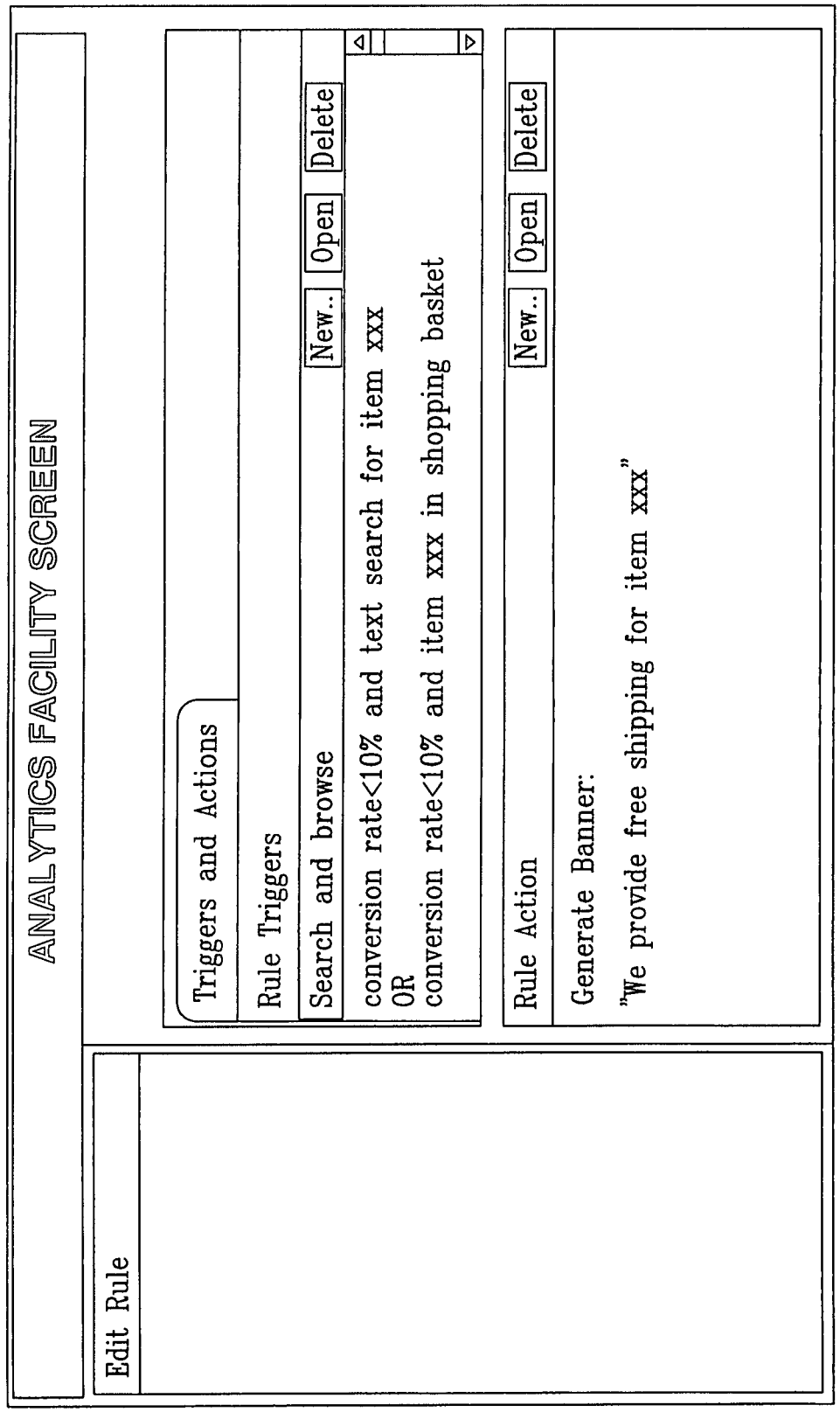
Figure 13:
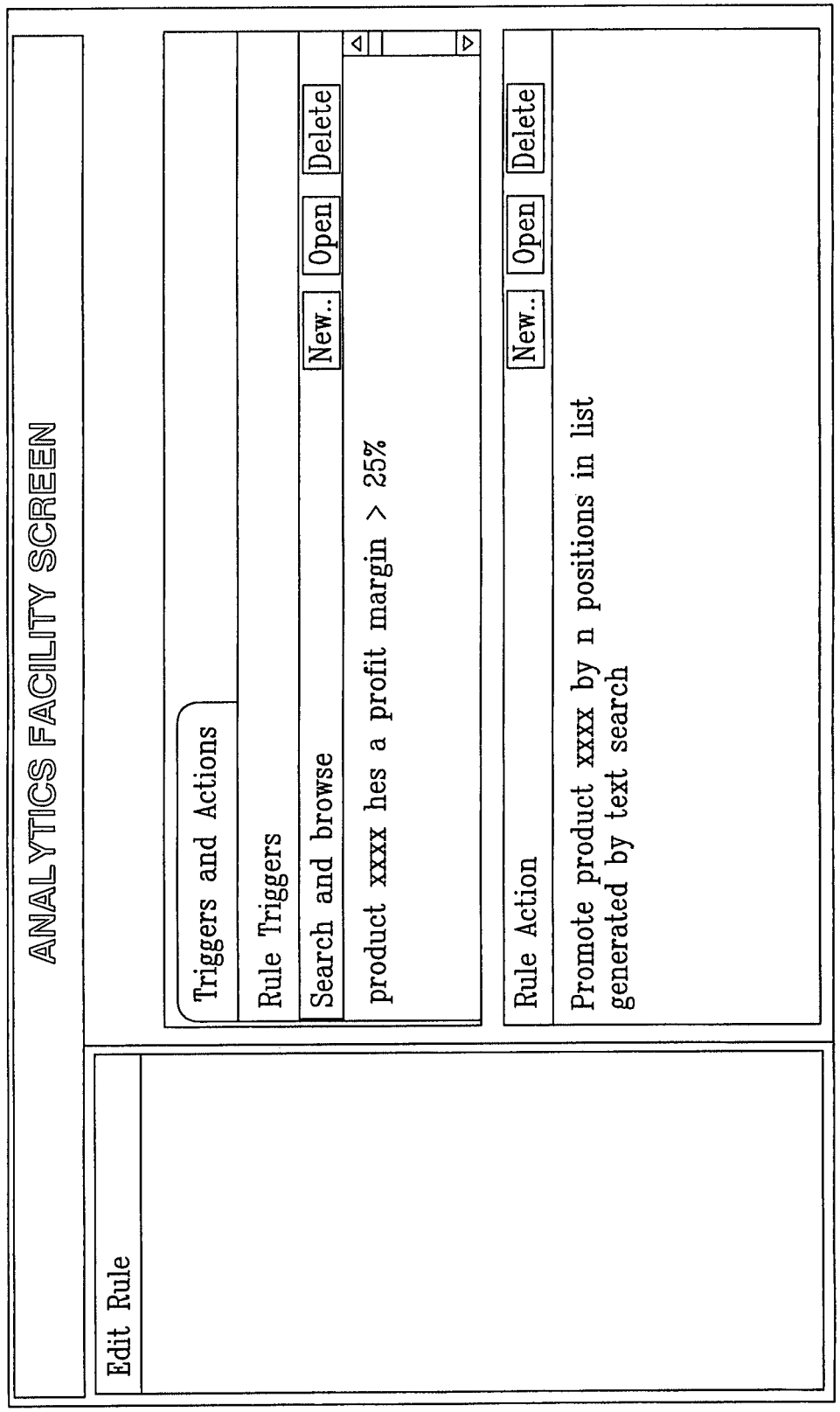

FIGS. 12 and 13 below give further examples of automatic rule templates for available actions for the business rules facility and/or the search/navigation facility. The available actions are automatically provided as applicable actions by the analytics facility to the administrator operating process 82.

FIG. 12 shows a generic rule template incorporating a promotional banner. The template corresponds with rows 4 and 5 of Table I, and is generated by developer 38 in process 52 as an available action $SA_n$. The template is herein, by way of example, assumed to be a free shipping rule template that suggests presentation of a "free shipping banner." The template is defined to be applicable in a text search context with a relatively low conversion rate, using the particular text as a trigger, and also to be applicable in a product context with a relatively low conversion rate, using placement of the particular product in the shopping basket as a trigger. The template is generic in that it applies to any search or product that is displayed as a search result or that is placed in the shopping basket, and which have a relatively low conversion rate.

In process 82 the catalog administrator uses the analytics facility to look at a query report, and selects a specific item with a high abandonment rate, i.e., a low conversion rate wherein a product has been placed in the end-user's shopping basket, but has in the end not been bought. The high abandonment rate acts as a context $C_n$ for the available action $SA_n$. In step 90 the analytics facility presents the free shipping rule template, with the specific item incorporated into the template. By the administrator accepting the free shipping rule template, the free shipping rule is incorporated into the on-line catalog. The rule is triggered by the end-user searching for the specific item or placing the specific item in the shopping basket, and generates a free shipping banner as part of the response to the end-user.

The description above assumes that the free shipping rule template defines a fixed free shipping banner. The developer may instead define the template to:

Leave the choice of banner to the administrator when implementing the rule.

Present a number of fixed banners, that the administrator can choose from.

Suggest a most effective banner for the current context. The suggestion may advantageously be based on accumulated success statistics for banners in a given query or banner context. In this case, to complete the template the analytics facility accesses data that has been previously generated by actions of the end-users, and/or other data, and presents one or more banners, based on analysis of the actions or other data, for the administrator to select. The administrator may choose from the presented banners. Alternatively, the administrator may select an option that depends on conditions, such as the most up-to-date on-line catalog statistics, that the search/navigation facility or business rules facility access as the end-user applies the rule template trigger.

Apply other options. For example, rather than presenting a banner, the template may provide other actions, such as promoting a specific group of products.

In an alternative embodiment of the present invention, the administrator may select multiple text searches simultaneously, and apply a rule to all such searches. For example, the administrator may modify the rule template of FIG. 12 by changing the trigger to be any one of an itemized list of texts searched, and apply the free shipping rule template to all searches on the list. In this case, an end-user search that matches any one of the text searches triggers the rule defined by the rule template.

Embodiments of the present invention also allow for the fully automatic application of suggestions, with no further administrator intervention after the initial rule template definition, as described in the following example.

FIG. 13 shows a rule template defined by developer 38, corresponding to row 6 of Table I, according to an embodiment of the present invention. The template's rule has been instantiated by the available action context, that a product has a profit margin greater than a preset percentage, assumed as an example to be 25%. The available action is a rule to promote the product whenever it appears in a list of similar products generated by the search/navigation facility, by having the product appear earlier in the list by a preset number of products than before the promotion is implemented. The developer may also generate a generally similar rule template for a product having a low profit margin, less than a preset percentage, corresponding to row 7 of Table I. In this case the available action context is that a product has the low profit margin, and the available action is a rule to demote the product in a generated list of similar products.

In process 82, at initial step 84, the analytics facility may present a notice to the catalog administrator suggesting that the administrator apply either or both available actions to all products, or to a selected group of products, satisfying the triggers in the on-line catalog. In this case the available actions become suggested actions. In some embodiments, the analytics facility may apply the suggested actions for all products completely automatically, without intervention of the catalog administrator, as illustrated by line 85 of flowchart 80. Typically in the case of automatic application of the suggestions, the analytics facility notifies the administrator that the suggestions have been applied. Typically, a rule template for an automatic suggestion is completely specified by the relevant context, and there is no need for administrator interaction.

When the suggested actions are applied, a search performed by an end-user generates a set of answers that are re-ranked, i.e., promoted or demoted, according to the suggested actions' rules.

FIG. 14 is a flowchart 150 of a process 152 performed by administrator 22 to simulate an applicable action, according to an embodiment of the present invention. Process 152 typically utilizes end-user data already collected by system 20, prior to the administrator applying the applicable action to the on-line catalog.

In a first step 154 administrator 22 operates analytics facility 34, substantially as described above with respect to flowchart 82.

In a second step 156 the administrator decides on an applicable action, after having viewed the applicable action in step 90 of flowchart 82, or having modified or completed the applicable action in step 93 of the flowchart.

In a third step 158, the administrator sets AF 34 to simulate the applicable action decided on in step 156, by applying end-user usage data that has already been collected by the analytics facility. For example, if the applicable action corresponds to promoting a product according to the rule template described above with reference to FIG. 13, AF 34 may use stored end-user data to display a list of products to the administrator using the rule template. For comparison, the analytics facility may also display to the administrator a list wherein the rule template is not used.

In final steps 160 and 162, after viewing the simulation, the administrator may decide to implement or ignore the applicable action. Alternatively, the administrator may alter the applicable action, and iterate the simulation, as shown by line 164. For example, in the rule template of FIG. 13, the administrator may alter the number of items by which a product is promoted in the generated list.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for managing an on-line catalog, comprising:
operating an on-line catalog system via an on-line catalog management interface;
determining a list of available actions for implementing within the on-line catalog system;
transmitting catalog information from the on-line catalog system to user interfaces over a network,
wherein the transmitting provides the catalog information for display to end-users; and
subsequent to said determining the list of available actions:
collecting data of usage from end-user interactions via the user interfaces with the on-line catalog;
analyzing the data of usage collected from the end-user interactions; and
based on the analyzing the data of usage, automatically selecting, from the previously determined list, an applicable action for implementation within the on-line catalog system,
wherein once the applicable action is implemented, the operation of the on-line catalog system is subsequently changed according to the applicable action.

2. The method according to claim 1, wherein said determining the list of available actions comprises analyzing previous data of usage of the end-users interacting with the on-line catalog; and generating the list of available actions based on said analyzing.

3. The method according to claim 1, wherein determining the list comprises formulating respective contexts for each of the available actions in the list, and wherein automatically selecting the applicable action comprises determining that one of the respective contexts corresponds with a portion of the data of usage.

4. The method according to claim 1, wherein determining the list of available actions comprises analyzing other data of usage of other end-users interacting with one or more other on-line catalogs, and generating the list of available actions based on said analyzing the other data.

5. The method according to claim 1, further comprising providing the applicable action to a catalog administrator, and prompting the catalog administrator to perform one of accepting the applicable action, ignoring the applicable action, or modifying the applicable action.

6. The method according to claim 1,
wherein said determining the list in the on-line catalog system comprises providing a given context for a given available action of the list; and
the method further comprising, in response to said automatically selecting, automatically implementing the selected applicable action within the on-line catalog system.

7. The method according to claim 1, wherein the data of usage comprises data generated in response to a search for text, and wherein the list of available actions comprises a given available action to expand the search by using a synonym of the text in response to a future search for the text, wherein the synonym corresponds to a product of the on-line catalog.

8. The method according to claim 1, wherein said determining the list of available actions comprises analyzing data other than data of usage of the end-user interactions, and generating the list in response to of available actions based on said analyzing of the other data.

9. The method according to claim 1, further comprising:
in response to said automatically selecting, automatically incorporating implementing the selected applicable action within the on-line catalog system; and
providing, to a catalog administrator, notification of said automatically implementing.

10. A system for operating an on-line catalog system providing an on-line catalog, comprising:
at least one processor, operating an on-line catalog system; and
a memory storing software instructions that when executed by the at least one processor performs:
determining a list of available actions for implementing within the on-line catalog system;
transmitting catalog information from the on-line catalog system to user interfaces over a network,
wherein the catalog information is provided for display to end-users; and
subsequent to said determining the list of available actions:
collecting data of usage from end-user interactions via the user interfaces with the on-line catalog;
analyzing the data of usage collected from the end-user interactions; and
based on the analyzing the data of usage, automatically selecting, from the previously determined list an applicable action for implementation within the on-line catalog system,
wherein once the applicable action is implemented, the operation of the on-line catalog system is subsequently changed according to the applicable action.

11. The system according to claim 10, wherein said determining the list of available actions comprises analyzing previous data of usage of the end-users interacting with the on-line catalog; and generating the list of available actions based on said analyzing.

12. The system according to claim 10, wherein the software instructions, when executed by the at least one processor, further perform: determining the list comprises formulating respective contexts for each of the available actions in the list, and wherein automatically selecting the applicable action comprises determining that one of the respective contexts corresponds with a portion of the data of usage.

13. The system according to claim 10, wherein the software instructions, when executed by the at least one processor, further perform: determining the list of available actions comprises analyzing other data of usage of other end-users interacting with one or more other on-line catalogs, and generating the list of available actions based on said analyzing the other data.

14. The system according to claim 10, wherein the software instructions, when executed by the at least one processor, further perform: providing the applicable action to a catalog administrator, and prompting the catalog administrator to modify the applicable action or accept the modified applicable action.

15. The system according to claim 10,
wherein said determining the list in the on-line catalog system comprises providing a given context for a given available action of the list, and
wherein the software instructions, when executed by the at least one processor, further perform: in response to said automatically selecting, automatically implementing the selected applicable action within the on-line catalog system.

16. The system according to claim 10, wherein the data of usage comprises data generated in response to a search for text, and wherein the list of available actions comprises a given available action to expand the search by using a synonym of the text in response to a future search for the text, wherein the synonym corresponds to a product of the on-line catalog.

17. The system according to claim 10, wherein said determining the list of available actions comprises analyzing data other than data of usage of the end-user interactions, and generating the list of available actions in response to said analyzing of the other data.

18. The system according to claim 14, wherein the software instructions, when executed by the at least one processor, further perform:
in response to said automatically selecting, automatically incorporating implementing the selected applicable action within the on-line catalog system; and
providing notification to a catalog administrator of said automatically implementing.

19. A computer software product for managing an on-line catalog, the product comprising a computer-readable medium having computer program instructions recorded therein, which instructions, when read by a computer, cause the computer to:
operate an on-line catalog system via an on-line catalog management interface;
determine a list of available actions for implementation within the on-line catalog system;
transmit catalog information from the on-line catalog system to user interfaces over a network,
wherein the transmitting provides the catalog information for display to end-users;
subsequent to said determination of the list of available actions:
collect data of usage from end-user interactions via the user interfaces with the on-line catalog;
analyze the data of usage collected from the end-user interactions; and
based on said analysis of the data of usage, automatically select, from the previously determined list, an applicable action for implementation within the on-line catalog system,
wherein once the applicable action is implemented, the operation of the on-line catalog system is subsequently changed according to the applicable action.

* * * * *